Figure 1:
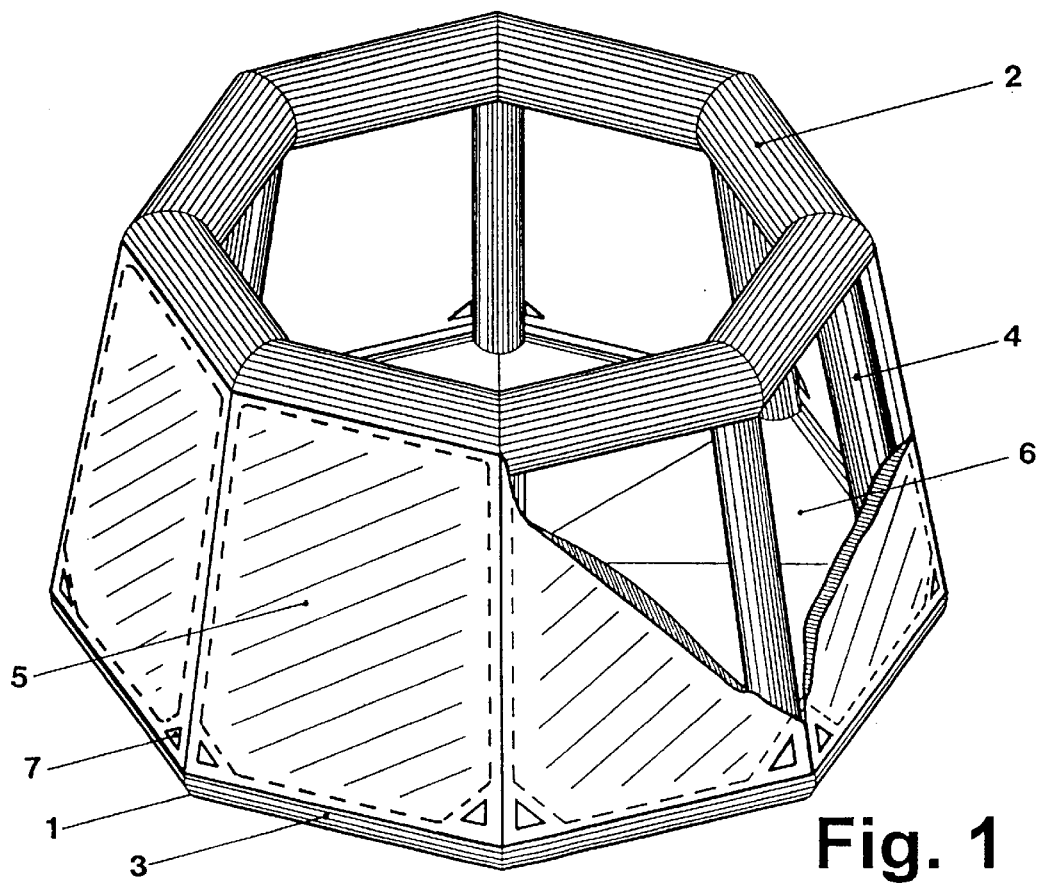

United States Patent [19]
Reinhard

[11] Patent Number: 5,853,147
[45] Date of Patent: Dec. 29, 1998

[54] BALLOON BASKET

[75] Inventor: Andreas Reinhard, Zollikon, Switzerland

[73] Assignee: Prospective Concepts A.G., Zollikon, Switzerland

[21] Appl. No.: 875,557

[22] PCT Filed: Oct. 28, 1996

[86] PCT No.: PCT/CH96/00380

§ 371 Date: Sep. 15, 1997

§ 102(e) Date: Sep. 15, 1997

[87] PCT Pub. No.: WO97/18126

PCT Pub. Date: May 22, 1997

[30] Foreign Application Priority Data

Nov. 15, 1995 [CH] Switzerland ............................. 3237/95

[51] Int. Cl.$^6$ ....................................................... B64B 1/40
[52] U.S. Cl. ............................................................... 244/31
[58] Field of Search ................................. 244/30, 31, 32, 244/118.5, 127

[56] References Cited

U.S. PATENT DOCUMENTS 1,538,974  5/1925  Cray .
3,176,327  4/1965  Oberth ................................... 244/31 X
3,176,935  4/1965  White et al. ............................... 244/31
4,619,422  10/1986  Petrehn .

FOREIGN PATENT DOCUMENTS 76 576  8/1894  Germany .

*Primary Examiner*—Charles T. Jordan
*Assistant Examiner*—Charles R. Ducker, Jr.
*Attorney, Agent, or Firm*—Jenkens & Gilchrist

[57] ABSTRACT

The balloon basket (1) according to the invention essentially comprises several pneumatic elements: an upper ring (2) and a lower ring (3), both advantageously segmented, are joined by a number of struts (4). The number of these struts (4) preferably corresponds to the number of corners of the polygonally formed rings (2, 3) and the number of their segments. Between the rings (2, 3) and the struts (4) side wall elements (5) are arranged so that they—apart from the holes (7) made in them—tightly seal the balloon basket (1) at the sides. In the lower ring (3) is fitted a floor (6). Side wall elements (5) and floor (6) are made with double walls and comprise at least in part of distance fabric such that the two corresponding walls of the side elements (5) and the floor (6) are held together by a plurality of threads and therefore retain their flat form on inflation with compressed air.

13 Claims, 2 Drawing Sheets

BALLOON BASKET

The present invention relates to a balloon basket in accordance with the preamble to claim 1.

Balloon baskets, especially those for hot air balloons, are in wide use; they comprise in the main a weave of willow rods or natural or artificial materials with similar properties.

Such known baskets are comparatively heavy and offer practically no impact protection for the pilot and passengers in a heavy landing. Added to this, they are very penetrable by wind, which in climbing or descending at great heights makes itself very noticeable as a troublesome cold draught. A further disadvantage lies in the large volume of such a basket, which inevitably calls for a vehicle trailer for the road transport of a hot air balloon—or at least for the basket.

The aim which is to be addressed by the present invention, is the procurement of a basket, especially for hot air balloons, which overcomes the stated disadvantages, thus is light, offers good impact resistance in the event of a hard landing, is wind-proof and presents only a small volume for road transportation.

The solution of the aim set is addressed in the characterising part of claim 1 with respect to its major characteristics, in those of claims 2 to 13 with respect to further advantageous developments.

Figure 4:
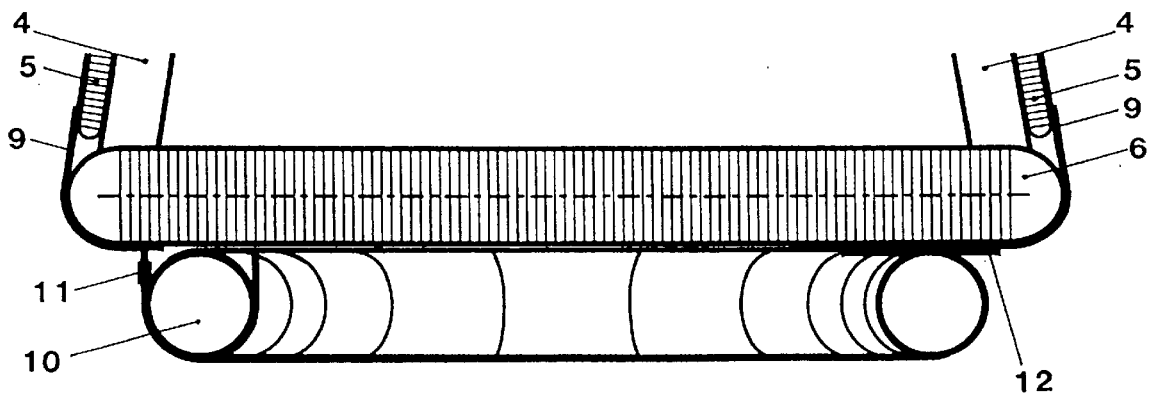
Figure 2:
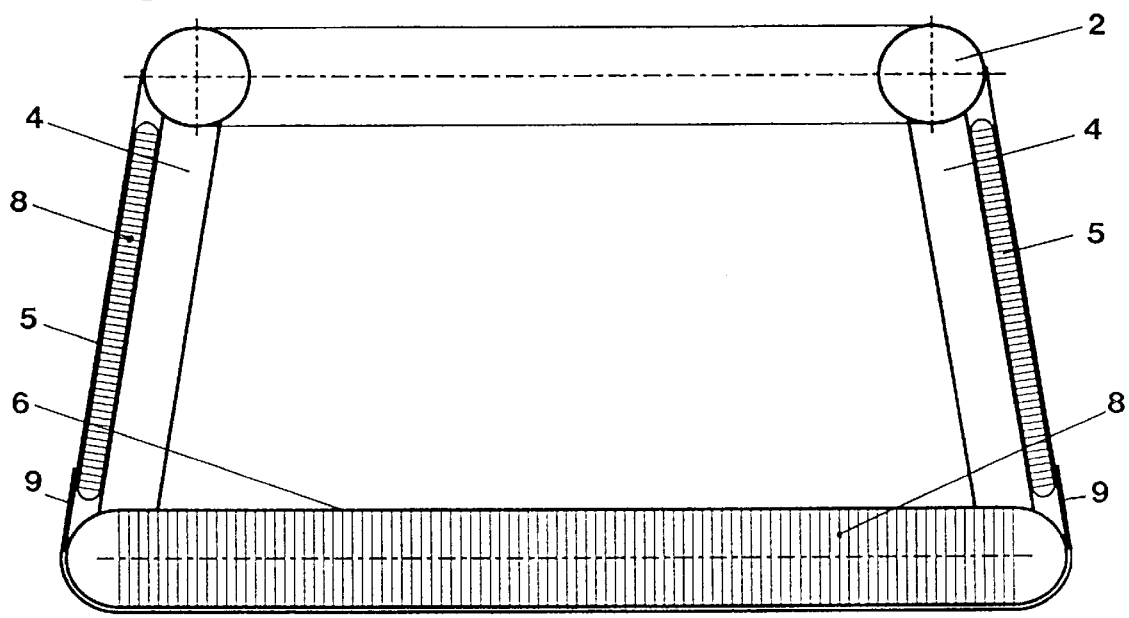
Figure 3:
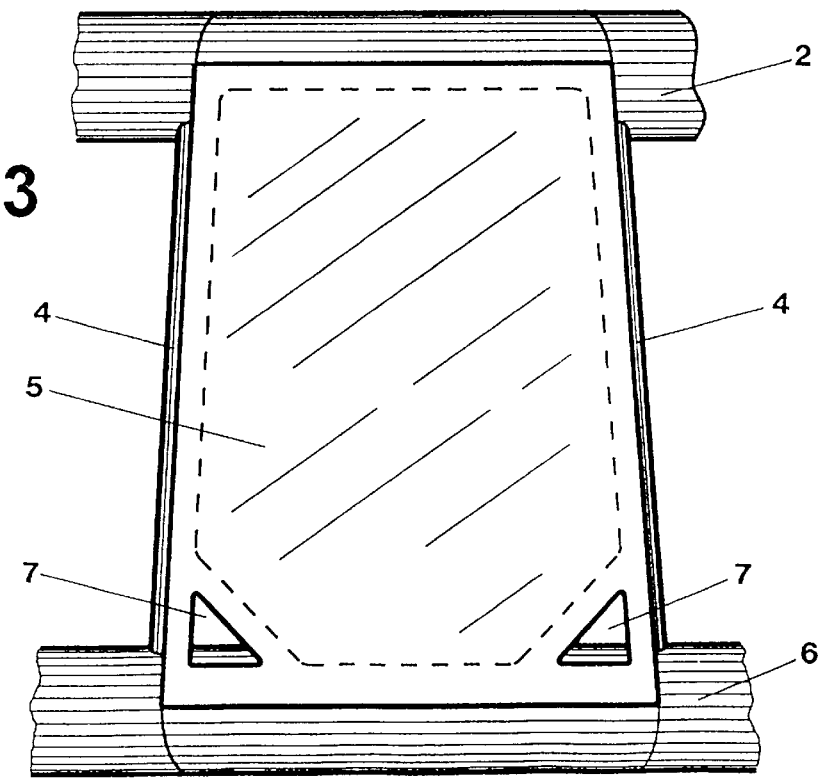

The object of the invention is more closely explained using the attached drawings. Shown are:

FIG. 1 a first example of construction of a balloon basket in diagonal view, partly cut away, FIG. 2 a second Example of construction of a balloon basket in cross section, FIG. 3 a part view of a basket according to the invention, FIG. 4 a detail of an advantageous development in section.

FIG. 1 shows an example of construction of a balloon basket 1 according to the invention in a diagonal view. The balloon basket 1 is constructed from an upper—here eight sided—ring 2, a lower ring 3—similarly within the scope of an example—octagonally constructed—and eight struts 4.

The upper ring 2, lower ring 3 and struts 4 are tubular pneumatic structures, comprising a fabric reinforced elastomer. For road transportation, that is in the non-operational condition, the pneumatic structures 2, 3, 4 are empty; for balloon flight, that is in the operational condition, they are filled with compressed air. Between the upper ring 2, the lower ring 3 and in each case two struts 4 the basket is provided—in this example—with eight side wall elements 5. Two of these side wall elements 5 are shown cut away and give a clear view of the floor, designated 6, of the basket 1. The inner structures of the side wall elements 5 and the floor 6, both double walled, are more clearly described using FIG. 2.

Each of the side wall elements 5 has two holes 7 in the two bottom corners, which ensure that the basket 1 is ventilated draught-free and that no accumulations of gas can form, which would originate from the gas bottles carried. The representation of lashings, eye bolts, and similar fastening elements, such as belong to the operation of a balloon basket, is not given here, on the one hand because they are not essential to the invention, and on the other because their attachment to elastomeric pneumatic structures is thoroughly within the state of the technology.

Instead of being octagonal, the balloon basket 1 can also be four or six sided or of any other polygonal shape. From the technical viewpoint a circular form is obviously also possible, but is somewhat disadvantageous with regard to a sliding landing, since the basket can thereby go into a rotating motion about its height axis. Similarly a circular or oval design of the rings 2, 3 is within the scope of the invention, whereby the selection of the struts optimally should not fall below four.

FIG. 2 shows a section through a four sided balloon basket 1. Both in the floor 6 and also in the side wall elements 5 threads 8 are shown, which join together the two walls of the elements designated 5 and 6 in each case: Side wall elements 5 and floor 6 are produced using so-called spacing weaves, whose two matrices serve as a reinforcing fabric for elastomers. Side wall elements 5 and floor 6 are attached at their edges using similarly reinforced elastomers. The rings 2, 3, struts 4, side wall elements 5 and floor 6 are all formed as pneumatic structures, that is in the operational condition, they are inflated with compressed air, empty in the non-operating state. Each of the elements designated 4, 5, 6 has a valve; the rings 2, 3 are each divided, for safety considerations, into several sections, each of which has its own valve. For pumping up, i.e. creation of the operational condition, the quoted valves, not shown, can be advantageously connected together by a ring feeder line, so as to speed up the inflation. For deflation each of the quoted elements has for instance a further valve with an opening of large cross section, also to accelerate the deflation.

In the example of construction according to FIG. 2 the lower ring 3 is integrated into the floor 6 and consequently comprises the reinforced elastomer side connections of the floor 6; thereby the lower ring 3, which with its valves is integrated in the floor 6 is dispensed with as an individual element. The rings 2, 3, the struts 4, the side wall elements 5 and the floor 6 are joined where they border each other, by fabric reinforced elastomeric cloths 9; only those are shown in FIG. 2, which join the side wall elements 5 to the floor 6. FIG. 3 shows one of the side wall elements 5 in outline. The double-walled part is shown shaded, which assumes part of the stabilising function along with the struts 4. Due to the double wall the side wall element 5 can not only accept tensile, but also pressure and shear forces. In the region of the holes 7 the side wall element 5 is only single walled. The connections to the pneumatic elements 2 to 6 and the cloths 9 are effected by glueing or welding.

In FIG. 4 the region of the floor 6 of the example of construction according to FIG. 2 is shown in detail. Detachably joined to the floor 6 is a further pneumatic element, here an essentially annular tube 10, which similarly to the other pneumatic elements 2, 3, 4, 5, 6, can be put under pressure and also similarly is manufactured from fabric reinforced elastomer. Corresponding to the purpose of the tube 10 its pressure can be lower than that in the other named pneumatic elements. The tube 10 is for example joined to the floor 6 by means of several straps 11 which grip around it—as shown on the left in FIG. 4—or on its whole joining surface by a gripping strip 12, as shown on the right in FIG. 4. The object of the tube 10 is, in the case of a hard or sliding landing, to afford increased protection on the one hand to the passengers in the balloon basket 1, and on the other to the balloon basket 1 itself, from the consequences of such landings. In accordance with its application the tube 10 is considered to be an abrasion object and therefore is joined detachably to the balloon basket 1. Alongside this quoted objective, the tube 10 provides the balloon basket 1 with additional buoyancy in the event of unavoidable landing in water.

Instead of an annular tube 10 other shapes are conceivable and within the scope of the invention.

I claim:

1. A basket for hot air balloons, characterised in that it comprises pneumatic elements, which can be inflated with compressed air, namely an upper ring (2), a lower ring (3), a plurality of struts (4), which essentially extend vertically from the lower ring (3) to the upper ring (2), a number of side wall elements (5), corresponding to the number of struts (4) and a floor (6), the two rings (2, 3) and the struts (4) comprise tube-like hollow bodies, whose walls are manufactured from reinforced elastomer, the side wall elements (5) and the floor (6) are double walled and comprise distance fabrics, whose two matrices are joined by threads and simultaneously provide the reinforcement for the sealing elastomer, the side wall elements (5) and the floor (6) have an airtight edging of similarly reinforced elastomer, whereby the side wall elements (5) and the floor (6) are airtight pneumatic elements, each of the pneumatic elements quoted (2, 3, 4, 5, 6) has at least one valve, which serves for the inflation with compressed air and similarly for deflation, the side wall elements (5) are joined to the upper ring (2), to the side in each case to a strut (4) and below to the lower ring (3).

2. A basket for hot air balloons according to claim 1, characterised in that the lower ring (3) is formed from connection of the floor (6) and therefore does not constitute an individual pneumatic element.

3. A basket for hot air balloons according to claim 1 or claim 2, characterised in that at least four struts (4) are present.

4. A basket for hot air balloons according to claim 1 or claim 2, characterised in that the rings (2, 3), the struts (4) and the side wall elements (5) are joined by means of fabric reinforced elastomer cloths (9), and the quoted elements (2, 3, 4, 5) are joined using the cloths (9) by glueing.

5. A basket for hot air balloons according to claim 1 or claim 2, characterised in that the rings (2, 3), the struts (4) and the side wall elements (5) are joined by means of fabric reinforced elastomer cloths (9), and the quoted elements (2, 3, 4, 5) are joined using the cloths (9) by welding.

6. A basket for hot air balloons according to claim 1 or claim 2, characterised in that the rings (2, 3), the struts (4) and the side wall elements (5), which form the entirety of the pneumatic elements, each has a valve for pumping up and one for deflation.

7. A basket for hot air balloons according to claim 6, characterised in that the valves for inflation are connected together by a ring feeder line.

8. A basket for hot air balloons according to claim 1 or claim 2, characterised in that a further pneumatic element is present, which is attached by a detachable connection below the floor (6) of the basket (1).

9. A basket for hot air balloons according to claim 8, characterised in that the further pneumatic element is essentially an annular tube (10).

10. A basket for hot air balloons according to claim 8, characterised in that the detachable connection comprises straps (11).

11. A basket for hot air balloons according to claim 8, characterised in that the detachable connection comprises a gripping strip (12).

12. A basket for hot air balloons according to claim 1 or claim 2, characterised in that each of the side wall elements (5) at its edge bordering the lower ring (3) has at least one hole (7) leading from the inner side to the outer side of the basket (1), whereby accumulations of gas in the basket (1) can be avoided.

13. A basket for hot air balloons according to claim 1, characterised in that the two rings (2, 3) are divided into several sections which are pneumatically separated from each other.

* * * * *

UNITED STATES PATENT AND TRADEMARK OFFICE
CERTIFICATE OF CORRECTION

PATENT NO. :    5,853,147
DATED      :    Dec. 29, 1998
INVENTOR(S) :   Reinhard It is certified that error appears in the above-identified patent and that said Letters Patent is hereby corrected as shown below:

Column 3, line 29     Replace "connection"
                          With --an edge--

Signed and Sealed this

Twenty-seventh Day of July, 1999

Attest:

Q. TODD DICKINSON

*Attesting Officer*     *Acting Commissioner of Patents and Trademarks*